(12) United States Patent
Segev et al.

(10) Patent No.: US 12,449,971 B2
(45) Date of Patent: Oct. 21, 2025

(54) KEY-PER-IO MULTIPLE TENANT ISOLATION

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 49 days.

(21) Appl. No.: 18/355,093

(22) Filed: Jul. 19, 2023

(65) Prior Publication Data

US 2024/0256124 A1 Aug. 1, 2024

Related U.S. Application Data

(60) Provisional application No. 63/482,735, filed on Feb. 1, 2023.

(51) Int. Cl.
G06F 3/06 (2006.01)

(52) U.S. Cl.
CPC .......... *G06F 3/0604* (2013.01); *G06F 3/0659* (2013.01); *G06F 3/0673* (2013.01)

(58) Field of Classification Search
CPC .... G06F 3/0604; G06F 3/0659; G06F 3/0673; G06F 3/0679
See application file for complete search history.

(56) References Cited

U.S. PATENT DOCUMENTS

| | | | |
|---|---|---|---|
| 9,292,673 B2 | 3/2016 | Rutkowski et al. | |
| 10,819,513 B2 | 10/2020 | Agarwal et al. | |
| 10,848,302 B2 * | 11/2020 | Das | H04W 4/40 |
| 11,287,994 B2 | 3/2022 | Choi et al. | |
| 2017/0351431 A1 * | 12/2017 | Dewitt | G06F 3/0619 |
| 2019/0073152 A1 | 3/2019 | Nagle et al. | |

(Continued)

FOREIGN PATENT DOCUMENTS

| EP | 3260971 A1 | 12/2017 |
|---|---|---|
| EP | 3851950 A1 | 7/2021 |

OTHER PUBLICATIONS

Donghyun Min et al., "Isolating Namespace and Performance in Key-Value SSDs for Multi-tenant Environments" Dept. of Computer Science and Engineering, Sogang University, Seoul, Republic of Korea, Jul. 27-28, 2021.

*Primary Examiner* — Tasnima Matin
(74) *Attorney, Agent, or Firm* — Patterson + Sheridan, LLP

(57) ABSTRACT

The present disclosure generally relates improved key-per IO (KIPO) processing for multiple tenants. Rather than when a tenant requests a key change to stop tenants from working, indirect-double-indexing can be used to prevent bandwidth loss in tenants during adaptions for other tenants. When a tenant requests to manipulate the key-index table, the system will keep working. The current key index list will be duplicated. While the duplicated key-index list is manipulated according to the request, all tenants may still work on their current key-index tables until the request is complete. Once the request is complete, the tenant with the request will switch to the new table, while the old table is updated. Once the old table is updated, the tenant will switch to the updated table for continued work. No tenant, including the tenant that makes the request, continues working as the request is completed.

15 Claims, 11 Drawing Sheets

(56) References Cited

U.S. PATENT DOCUMENTS

| | | | |
|---|---|---|---|
| 2019/0081884 A1* | 3/2019 | Spohn | H04L 45/125 |
| 2021/0165589 A1* | 6/2021 | Heo | G06F 3/0641 |
| 2021/0181988 A1* | 6/2021 | Kim | G06F 3/0604 |
| 2021/0373777 A1* | 12/2021 | Dubucq | G06F 3/067 |
| 2021/0377017 A1 | 12/2021 | Benisty et al. | |
| 2021/0397722 A1 | 12/2021 | Sapuntzakis et al. | |
| 2022/0029793 A1 | 1/2022 | Kachare et al. | |
| 2023/0016020 A1* | 1/2023 | Kim | G06F 3/0622 |
| 2023/0305750 A1* | 9/2023 | Sasaki | G06F 3/0664 |

* cited by examiner

| Controller Key-Index |
|---|
| Key 0 |
| Key 1 |
| Key 2 |
| Key 3 |
| Key 4 |
| Key 5 |

| NS Key-Index |
|---|
| NS0 – Key0 |
| NS0 – Key1 |
| NS1 – Key0 |
| NS1 – Key1 |
| NS1 – Key2 |
| NS3 – Key0 |

FIG. 2

| NS Key-Index | |
|---|---|
| NS0 – Key0 | |
| NS0 – Key1 | |
| NS1 – Key0 | |
| NS1 – Key1 | |
| NS1 – Key2 | |
| NS3 – Key0 | |

| Controller Key-Index | |
|---|---|
| C-Key = 5 | |
| C-Key = 1 | |
| C-Key = 0 | |
| C-Key = 2 | |
| C-Key = 3 | |
| C-Key = 4 | |

FIG. 4

| NS Key-Index | |
|---|---|
| NS0 – Key0 |
| NS0 – Key1 |
| NS1 – Key0 |
| NS1 – Key1 |
| NS1 – Key2 |
| NS3 – Key0 |

| Controller Key-Index |
|---|
| C-Key = 5 |
| C-Key = 1 |
| C-Key = 0 |
| C-Key = 1 |
| C-Key = 3 |
| C-Key = 4 |

FIG. 5

KEY-PER-IO MULTIPLE TENANT ISOLATION

CROSS-REFERENCE TO RELATED APPLICATIONS

This application claims benefit of U.S. provisional patent application Ser. No. 63/482,735, filed Feb. 1, 2023, which is herein incorporated by reference.

BACKGROUND OF THE DISCLOSURE

Field of the Disclosure

Embodiments of the present disclosure generally relate to improved key-per IO (KPIO) processing for multiple tenants.

Description of the Related Art

The non-volatile memory express (NVMe) standard supports a feature called KPIO, which entails dealing with 64K keys. The keys are indexed from zero per namespace (NS) basis. As each tenant is typically using a designated NS, the keys management is done on a per tenant basis. For example the host device (i.e., specific tenant) issues a read command from NS 3, with key-per-IO index 8, which means that the data storage device needs to provide data using the key information that is stored in index 8 of NS 3. When working with multiple tenants (i.e., NS-es), each channel uses indexing specific to the channel. Therefore from the previous example NS 2 index 8, is a different key than NS 3 index 8.

As long as this NS key index list remains static, the approach is functional. However, problems might be observed when the host device wants to perform some management operations on the keys. The problems are further intensified when any operation on the keys themselves must be done atomically. Furthermore, the data storage device is not allowed to operate with some of the keys belonging to an old-version, and the rest of the keys, with a new version.

Therefore, there is a need in the art for improved KIPO processing for multiple tenants.

SUMMARY OF THE DISCLOSURE

The present disclosure generally relates improved key-per IO (KIPO) processing for multiple tenants. Rather than when a tenant requests a key change to stop tenants from working, indirect-double-indexing can be used to prevent bandwidth loss in tenants during adaptions for other tenants. When a tenant requests to manipulate the key-index table, the system will keep working. The current key index list will be duplicated. While the duplicated key-index list is manipulated according to the request, all tenants may still work on their current key-index tables until the request is complete. Once the request is complete, the tenant with the request will switch to the new table, while the old table is updated. Once the old table is updated, the tenant will switch to the updated table for continued work. No tenant, including the tenant that makes the request, continues working as the request is completed.

In one embodiment, a data storage device comprises: a memory device; and a controller coupled to the memory device, wherein the controller is configured to: maintain a local key index list, wherein the local key index list includes a plurality of entries with each entry corresponding to a key, wherein a first entry of the plurality of entries is a spare entry and a second entry of the plurality of entries comprises a first value; maintain a controller key index list, wherein the controller key index list includes a plurality of controller key entries corresponding to the local key index list and wherein a third entry of the plurality of controller key entries comprises the first value; receive an instruction to change the first value to a second value; enter the second value into the spare entry; mark the second entry as a spare entry; and change the third entry to the second value.

In another embodiment, a data storage device comprises: a memory device; and a controller coupled to the memory device, wherein the controller is configured to: maintain a first controller key index list, wherein the first controller key index list includes a plurality of first controller key entries and wherein a first controller key index first entry comprises a first value; maintain a second controller key index list, wherein the second controller key index list includes a plurality of controller key entries and wherein a second controller key index first entry comprises the first value; receive an instruction to update the first controller key index list or the second controller key index list; update the first controller key index list; and perform data transfer using the first controller key index list.

In another embodiment, a data storage device comprises: memory means; and a controller coupled to the memory means, the controller including: a data path; and a control path, wherein the control path includes: a namespace/key indexing module; a processor; a mux coupled to the processor; a first indirect list module coupled between the mux and the namespace/key indexing module; and a second indirect list module coupled between the mux and the namespace/key indexing module.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a table illustrating a direct key indexing, according to certain embodiments.

FIG. 4 is a table illustrating an indirect key indexing, according to certain embodiments.

FIG. 5 is a table illustrating a shared key indexing, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates improved key-per IO (KIPO) processing for multiple tenants. Rather than when a tenant requests a key change to stop tenants from working, indirect-double-indexing can be used to prevent bandwidth loss in tenants during adaptions for other tenants. When a tenant requests to manipulate the key-index table, the system will keep working. The current key index list will be duplicated. While the duplicated key-index list is manipulated according to the request, all tenants may still work on their current key-index tables until the request is complete. Once the request is complete, the tenant with the request will switch to the new table, while the old table is updated. Once the old table is updated, the tenant will switch to the updated table for continued work. No tenant, including the tenant that makes the request, continues working as the request is completed.

Figure 1:
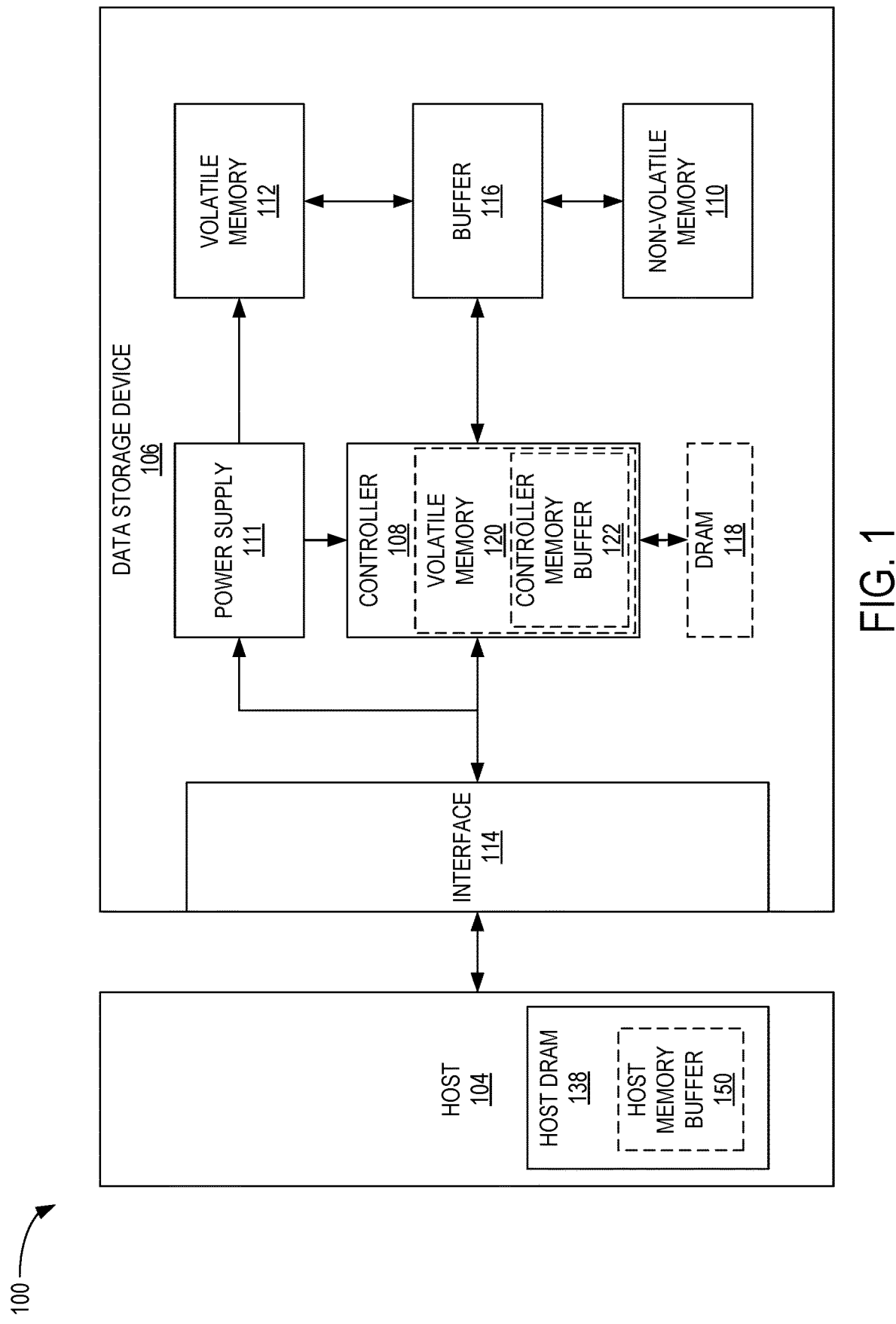
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

When working with multiple tenants, each channel uses a different index such that different namespaces utilize different keys even though the index number may be the same. To resolve the issue, an indirection table is used inside of the controller. FIG. 2 shows such a scheme. FIG. 2 is a table 200 illustrating a direct key indexing, according to certain embodiments. The NS key-index is a direct connection to the controller key-index. For every NS key-index there is a controller key-index. The NS key-index and the controller key-index are in order by name and value. The NS key-index dictates the order of the controller-key index.

FIG. 2 shows a case where NS0, NS1, and NS3 are configured to be used with key-per-IO. In this example the NS key-index has multiple keys: NS0 supports two keys (Key0, Key1), NS1 supports three keys (Key0, Key1, Key2), and NS3 supports one Key (Key0). Each namespace will be using two variables: base key (BKEY) and max local key (MKEY). For this example the BKEY and MKEY will have these values (NS0 will hold BKEY=0, MKEY=1; NS1 will hold BKEY=2, MKEY=2; NS3 will hold BKEY=5, MKEY=0). When a command arrives to NS1 with key-index=2, the controller will calculate a key value of "2+2=4" (NS1.BKEY+commands' key-index), which is then used for the key-index.

Figure 3:
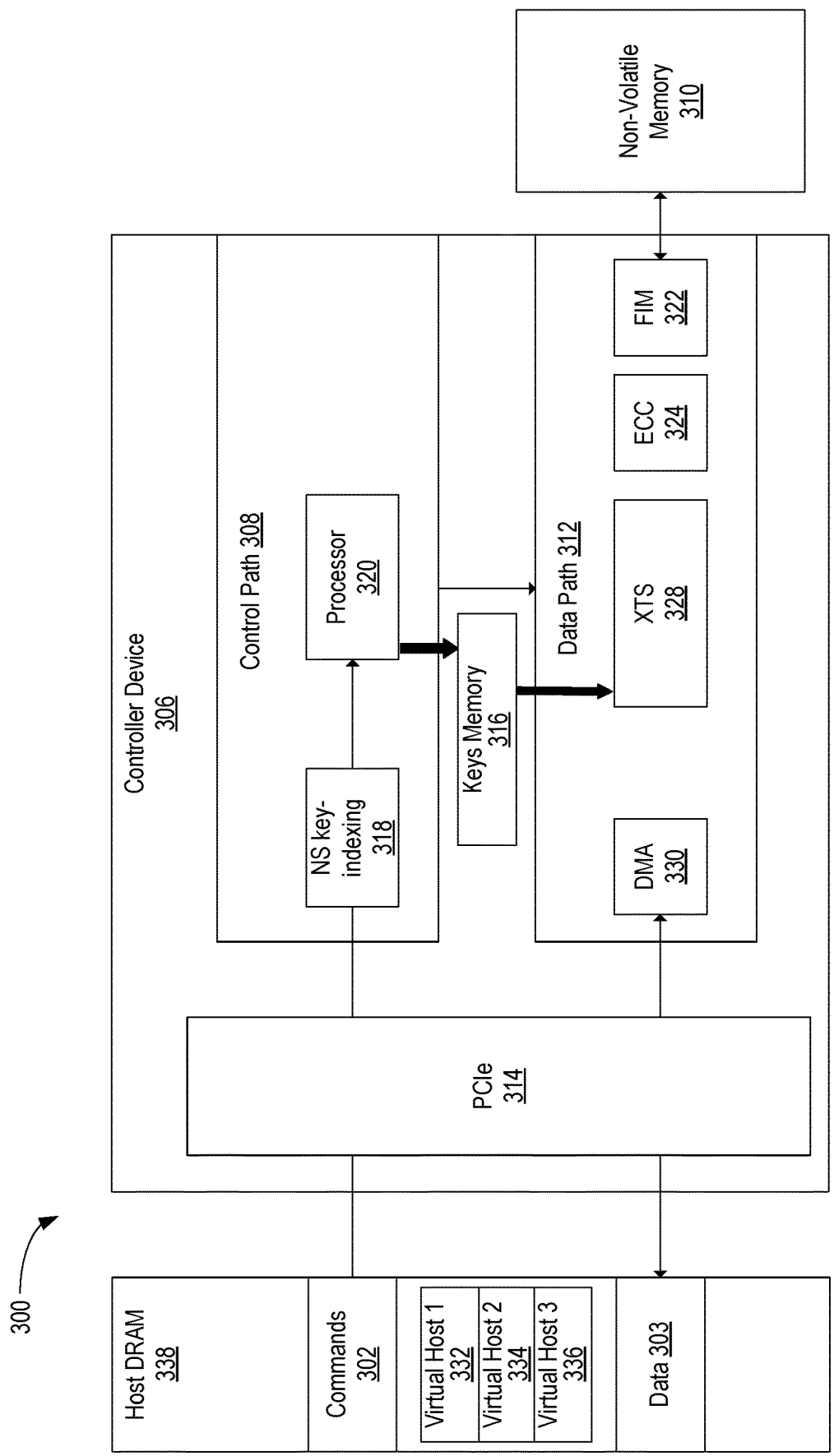
FIG. 3 is a schematic block diagram illustrating a system with direct key index lists, according to certain embodiments.

FIG. 3 is a schematic block diagram illustrating a system 300 with direct key index lists, according to certain embodiments. FIG. 3 shows a host device with three tenants (virtual hosts), a controller device, and a NVM. For example, when any of the virtual hosts request to perform a read operation (using KPIO) the command goes through the NS-key-indexing mechanism as described above (See table 200). Once the command reaches the CPU with the correct key index the controller then triggers the data transfer path. The data transfer path provides the command with the correct key index once the correct key index is received from the NS-key-indexing mechanism. The data path then moves to fetch data from the NVM (e.g., NAND), which is done by the flash interface module (FIM). Then the error correction code (ECC) corrects any errors found in the data (command). Following error correction the decoder decrypts the data using security key information pointed to by the key-index, and finally passes the data from the direct memory access (DMA) to the host.

The system 300 comprises a host DRAM 338, a data storage device controller 306, and a NVM 310. The host DRAM 338 comprises a plurality of virtual hosts. The system 300 may function as a storage device for the host DRAM 338. For instance, the host DRAM 338 may utilize NVM 310 to store and retrieve data. The host DRAM includes commands 302, data 303, virtual host 1 332, virtual host 2 334, and virtual host 3 336. Commands 302 are sent to the device controller 306 from any of the virtual hosts 332, 334, 336, while data 303 is received from the device controller 306.

The data storage device 306 includes a control path 308, a data path 312, a keys memory 316, and a PCIe bus 314. Control path 308 may include a NS key-indexing 318. NS key-indexing 318 is configured to determine the NS and the index of the commands 302. Control path 308 further includes a processor 320 that will trigger the keys memory 316 to provide the correct key index to the data path 312.

The data path 312 includes a FIM 322, ECC 324, XTS 328 (e.g., decoder), and DMA 330. The FIM 322 may fetch data 303 from the NVM 310. Data 303 will be sent from the NVM 310 to the FIM 322. The FIM 322 will send data 303 to ECC 324. Once ECC 324 finishes any error corrections, data 303 is sent to XTS 328. XTS 328 will use a key based key index from the key memory 316 to decrypt data 303. XTS 328 will then send the data 303 to the DMA 330. DMA 330 will then write data 303 to the host device.

KPIO may involve key sharing, key switching, or key adding, for example. For key sharing, the host device wants to use the same key for NS0-key1 and NS1-key1. In such a scenario, the data storage device will need to copy the key structure and maintain both copies atomically. For example considering FIG. 2, whenever an operation is required on key number 1, also key number 4 will need updating. For key switching, an example is when key1 NS1 needs to be updated, due to the autonomous requirement, accesses to the keys table needs to be prohibited when the key is updated. As a result, even tenants that did not request a key change suffer from bandwidth losses as the relevant commands cannot be executed while the key change is taking place. For key adding, adding a key to the first NS (i.e., NS0) means that the entire keys database needs to be manipulated and copied to make room. In the example of FIG. 2, the result would mean copying keys 2-5 to indexes 3-6 to make room for the new key. While manipulating the database, other tenants (i.e., tenants not requesting to add a key) are blocked from accessing the keys and therefore have respective commands that cannot be performed and thus suffer from bandwidth loss.

As will be discussed herein, the disclosure involves indirect double indexing to solve the bandwidth loss issues. Using the approach when one tenant needs to manipulate the security keys, other tenants can keep working. There are two steps to solving the issue: indirect indexing and double indexing.

FIG. 4 portrays an example of an indirect indexing scheme. FIG. 4 is a table 400 illustrating an indirect key indexing, according to certain embodiments. The NS key-index is an indirect connection to the controller key-index. For every NS key-index there is a controller key-index. Only the NS key-index is in order by name and value, while the controller key-index has no order. Opposed to table 200 where both the NS key-index and the controller key-index are in order by name and value. The NS key-index does not dictate the order of the controller key-index.

Continuing the example from FIG. 2 here at FIG. 4, when a command arrives to NS1 with Key-index-2, the controller will calculate a key value of "2+2=4" (NS1.BKEY+commands' key-index). The temporary value is then used to lookup the actual key-index. The value 4, is searched in the lookup table to find that C-Key [4]-3. The key-index value used later by the data path will be 3.

FIG. 5 is a table 500 illustrating a shared key indexing, according to certain embodiments. Table 500 provides the controller with the option to share (when required) keys between different tenants by having the same controller key-index value in two different locations. Key sharing is when the host wants to use the same key for NS0-key1 and NS1-key1. In this case, without the temporary C-key value, the controller will need to copy the key structure and maintain both copies autonomously. The keys memory will need to have two copies of the same key. When the host asks to update the key, then the key will need to be updated in two locations. For example, whenever an operation is required on key number 1, also key number 4 needs updating. However, with the double indexing, both NS0-key1 and NS1-key1 points to the same actual key (C-Key=1 in both cases), and so only a single copy of the key needs to be updated.

Figure 6:
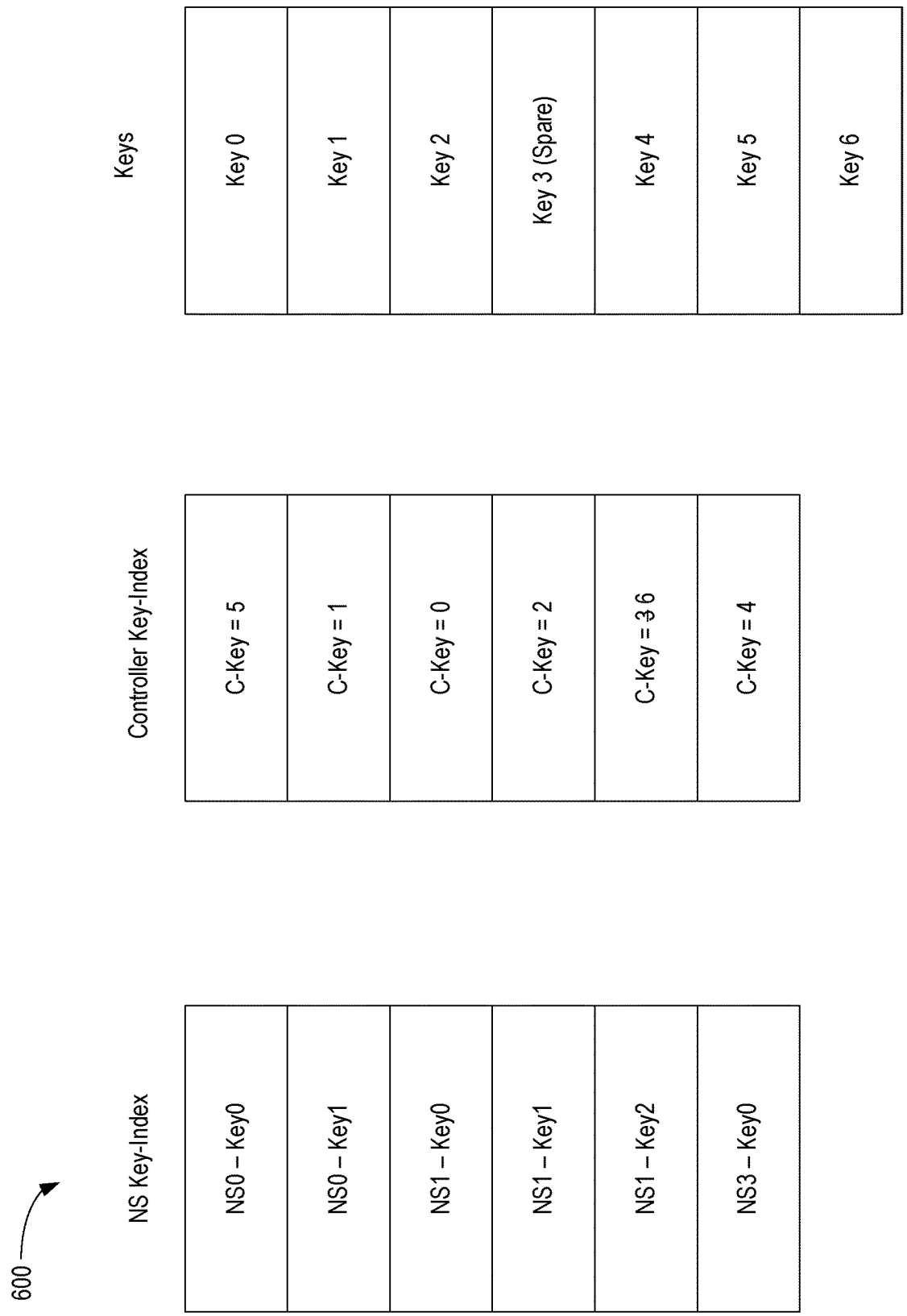
FIG. 6 is a table illustrating a key switch indexing, according to certain embodiments.

FIG. 6 is a table 600 illustrating a key switch indexing, according to certain embodiments. By holding a single spare local key-entry, table 600 allows flexibility when the firmware (FW) needs to switch a key. For example when NS1-Key2 needs to be switched to a new key. The new key is prepared under a spare entry (C-index 6), and when the new key is ready, C-key 3 is switched with C-key 6. Now C-key3 becomes the spare key. This key change can be done without disrupting any traffic.

By holding indirect indexing, keys not directly affected by the tenant key-management manipulation command, can still be accessed. As such other tenants do not suffer from bandwidth loss. This allows the triggering tenant to keep working (typically) using other keys while doing the key switch.

Figure 7:
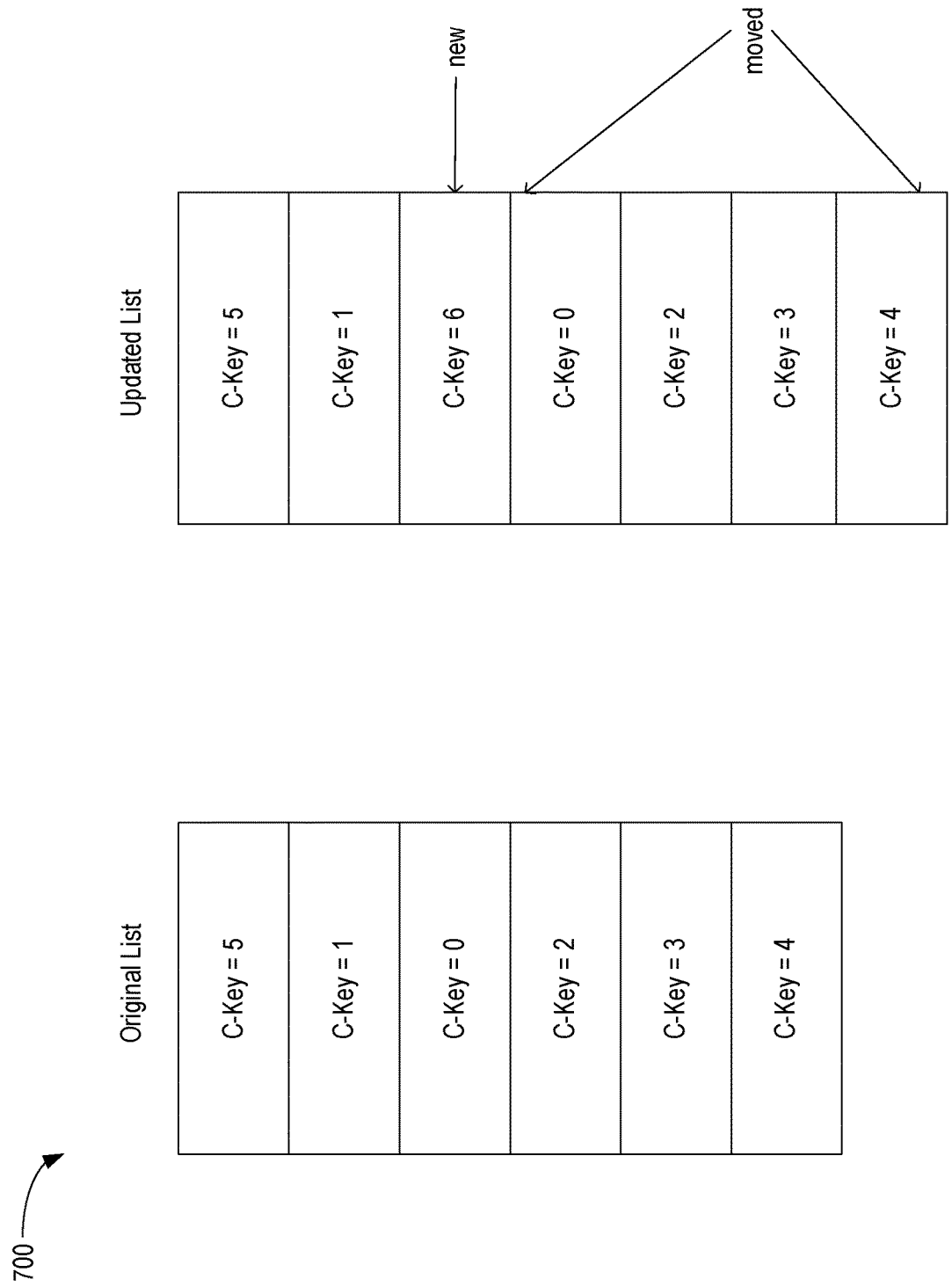
FIG. 7 is a table illustrating a new key insertion, according to certain embodiments.

FIG. 7 is a table 700 illustrating a new key insertion, according to certain embodiments. When a new entry needs to be pushed at the middle of the list, (i.e. a new key for NS0) the whole database still needs to be updated. For example adding a key to the first NS (i.e. NS0). Now the entire NS key-index (original list) needs to be manipulated and copied to make room for the new key entry. In the provided example, copy keys 2-5 to indexes 3-6 to make room for the new key. While manipulating the original list, other tenants (not requesting to add a NS) are blocked from accessing the keys, and therefore their respective commands cannot be performed so the other tenants suffer from bandwidth lost.

Figure 8:
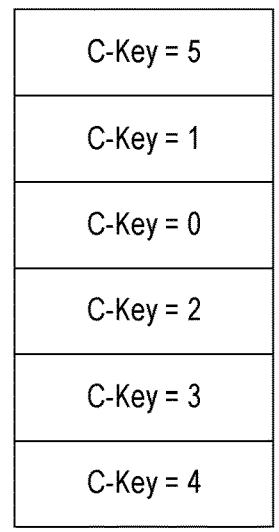
FIG. 8 is a table illustrating new key insertion using double key indirect indexing, according to certain embodiments.
Figure 8:
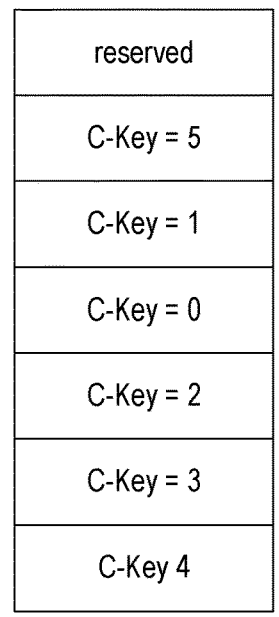
Figure 8:
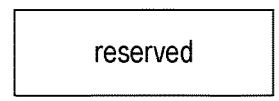

FIG. 8 is a table 800 illustrating new key insertion using double key indirect indexing, according to certain embodiments. In this mode, the hardware (HW) is working with a first (the top list of FIG. 8) set when FW gets a request to add another key to NS0. FW will add the new key to a second list (the bottom list of FIG. 8) while data transfer continues using the first set. Once done, the FW can autonomously switch between the first list and the second list. When the HW is working on the second list, the first list is updated to match the second list, to be prepared for the next change. While using double key indexing the tenant that makes the request to insert a new key, and other tenants continue working without interruption.

Figure 9:
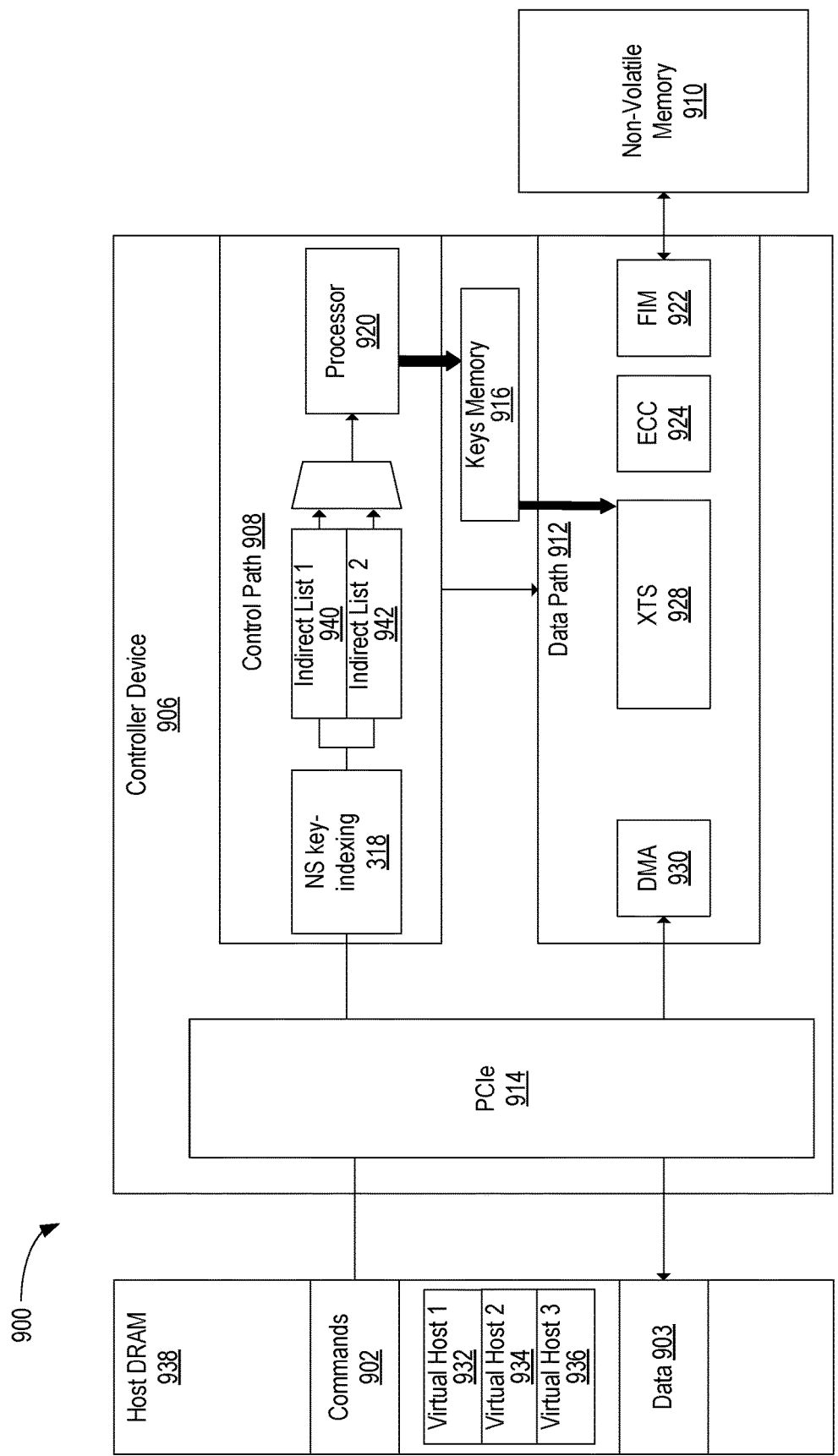
FIG. 9 is a schematic block diagram illustrating a system with double indirect key index lists, according to certain embodiments.

FIG. 9 is a schematic block diagram illustrating a system 900 with double indirect key index lists, according to certain embodiments. FIG. 9 shows a host with three tenants (virtual hosts), a device controller, and a NVM. When (for example) any of the hosts requests to perform a read operation (using KPIO) the command goes through the NS-key-indexing mechanism as described above. By adding a small (in memory area) translation table to decouple the host-key-indexes from the internal-key-indexes and by duplicating the NS key-index list, tenants are able to work continuously uninterrupted. If a tenant requests to manipulate the security requirements, the other tenants will not be affected. Also, the tenant asking for the manipulation will be unaffected as well. Since there are now two lists, the command is able to reach the CPU with the correct key index after the controller triggers the data transfer path. The data transfer path provides the command with the correct key index once it is received from the keys memory. The data path then moves to fetch data from the NVM, which is done by the FIM. Then the ECC corrects any errors found in the data (command). Following error correction the XTS decrypts the data using security key information pointed to by the key-index, and finally passes the data from the DMA to the host.

System 900 has a host DRAM 938, a data storage device controller 906, and a NVM 910. The host DRAM 938 comprises a plurality of virtual hosts. The system 900 may function as a storage device for the host DRAM 938. For instance, the host DRAM 938 may utilize NVM 910 to store and retrieve data.

The host DRAM includes commands 902, data 903, virtual host 1 932, virtual host 2 934, and virtual host 3 936. Commands 902 are sent to the device controller 906 from any of the virtual hosts 932, 934, 936, while data 903 is received from the device controller 906.

The data storage device 906 includes a control path 908, a data path 912, a keys memory 916, and a PCIe bus 914. Control path 908 includes a NS/key-indexing 918. NS/key-indexing 918 is configured to determine the NS and the index of the commands 902. Control path 908 further includes indirect index 1 940 and indirect index 2 942 to decouple the host key-indexes from the internal key indexes and duplicating the lists. Control path 908 further includes a processor 920 that will trigger the keys memory 916 to provide the correct key index to the data path 912.

The data path 912 includes a FIM 922, ECC 924, XTS 928, and DMA 930. For example FIM 922 may fetch data 903 from the NVM 910. Data 903 will be sent from the NVM 910 to the FIM 922. The FIM 922 will send data 903 to ECC 924. Once ECC 324 finishes any error corrections data 903 is sent to XTS 928. XTS 928 will use a key based on the key index from the key memory 916. XTS 928 will then send the data 903 to the DMA 930. DMA 930 will receive the data 903 from XTS 928 to write to host device.

Figure 10:
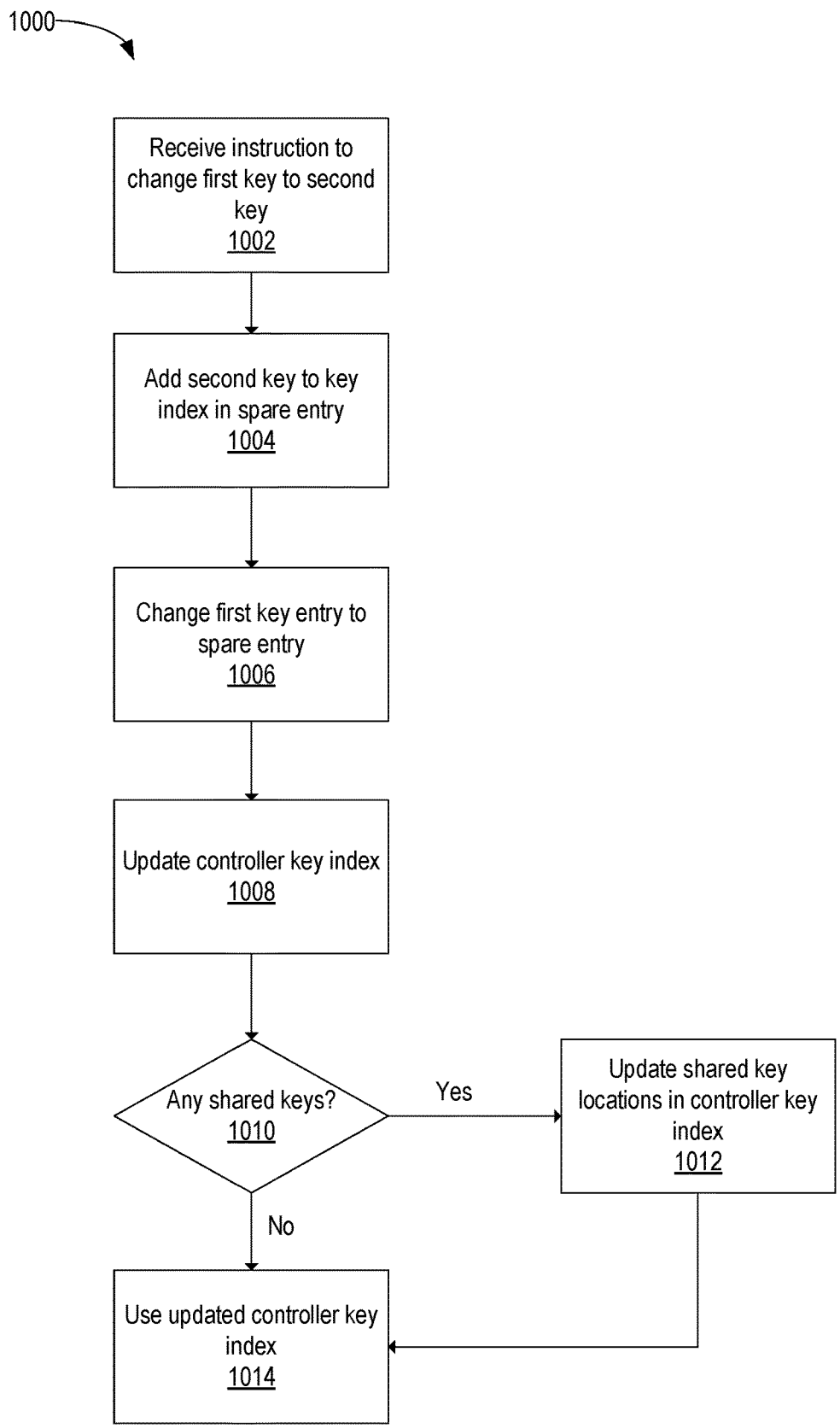
FIG. 10 is a flow chart illustrating a method of indirect indexing, according to certain embodiments.

FIG. 10 is a flow chart illustrating a method 1000 of indirect indexing, according to certain embodiments. The controller receives a request to change a key in the index table. To change the key a new key is prepared under a spare entry. When the new key is ready the spare key is switched for the new key. The controller key is then updated with the new key. This key change can be done without disrupting any traffic. By holding indirect indexing, keys not directly affected by the tenant key-management manipulation command, can still be accessed. As such other tenants do not suffer from bandwidth loss. This allows even the triggering tenant to keep working (typically) using other keys while doing the key switch.

At block 1002, the controller receives instructions to change the first key to second key. At block 1004, the second key is added to the spare entry of the key index list. At block 1006, the first key is changed to the spare entry. At block 1008, the controller key index list is updated. At block 1010, the controller determines whether the new key is a shared key. If the controller at block 1010 determines it is a shared key then the method continues to block 1012. At block 1012, the shared key locations are updated in the controller key index list and then continues to block 1014. If the controller at block 1010 determines the new key is not a shared key then method 1000 continues to block 1014. At block 1014, the controller uses the updated controller key index list.

Figure 11:
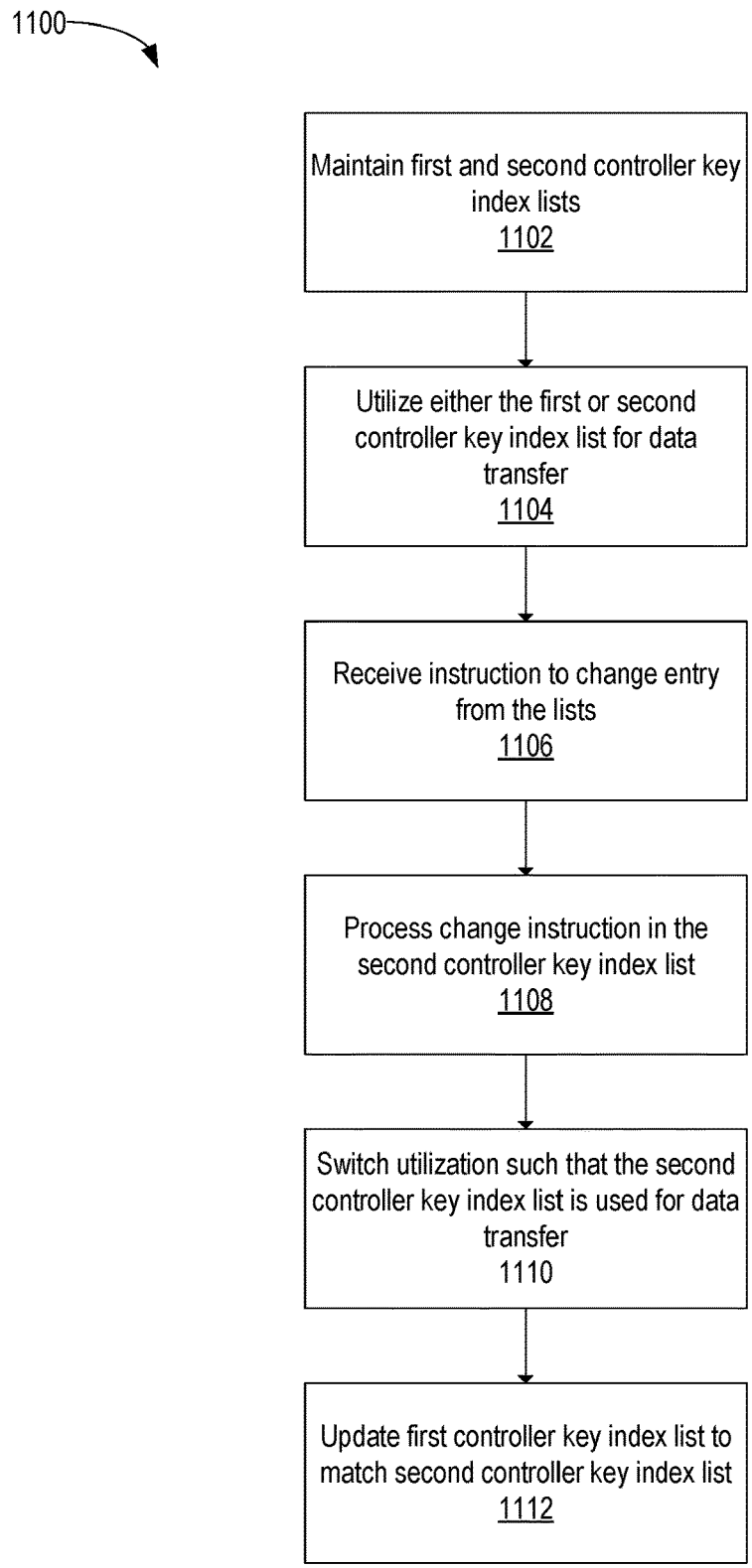
FIG. 11 is a flowchart illustrating a method of double key indirect indexing, according to certain embodiments.

FIG. 11 is a flow chart illustrating a method 1100 of double key indirect indexing, according to certain embodiments. By duplicating the NS key-index list, tenants are able to work continuously uninterrupted. If a tenant requests to manipulate the NS key-index list for data transfer, the other tenants will not be affected. Also, the tenant asking for the manipulation will be unaffected as well. Since there are now two lists the command is able to be executed without pausing the work of any of the tenants including the tenant with the request.

At block 1102, the first and second controller key index lists are maintained. At block 1104, the controller utilizes either the first controller key index list for data transfer or the second controller key index for data transfer. At block 1106, the controller receives instructions to change the entry from the first and second controller index lists. At block 1108, the controller processes the change instruction in the second controller key index list if the first controller key index was utilized at 1104 (alternatively the change instruction would occur to the first controller key index if the second controller key index was utilized at 1104). At block 1110, the utilization is switched such that the second controller key index list is used for data transfer. At block 1112, the controller updates the first controller key index list to match the second controller key index list.

Advantages of the disclosure include the isolation between tenants during required key management. Through tenant isolation, all tenants are able to continue working leading to increased performance and production of the system.

In one embodiment, a data storage device comprises: a memory device; and a controller coupled to the memory device, wherein the controller is configured to: maintain a local key index list, wherein the local key index list includes a plurality of entries with each entry corresponding to a key, wherein a first entry of the plurality of entries is a spare entry and a second entry of the plurality of entries comprises a first value; maintain a controller key index list, wherein the controller key index list includes a plurality of controller key entries corresponding to the local key index list and wherein a third entry of the plurality of controller key entries comprises the first value; receive an instruction to change the first value to a second value; enter the second value into the spare entry; mark the second entry as a spare entry; and change the third entry to the second value. The controller key index list correlates to a namespace key index, wherein the namespace key index includes at least a first namespace and a second namespace. The first value is for the first namespace. The second namespace remains operational during the receiving, the entering, the marking, and the changing. A fourth entry of the plurality of controller key entries comprises the first value. The controller is further configured to change the fourth entry to the second value. The controller is further configured to receive commands from a first host and a second host. The controller is further configured to process commands from the second host while performing the entering, marking, and changing.

In another embodiment, a data storage device comprises: a memory device; and a controller coupled to the memory device, wherein the controller is configured to: maintain a first controller key index list, wherein the first controller key index list includes a plurality of first controller key entries and wherein a first controller key index first entry comprises a first value; maintain a second controller key index list, wherein the second controller key index list includes a plurality of controller key entries and wherein a second controller key index first entry comprises the first value; receive an instruction to update the first controller key index list or the second controller key index list; update the first controller key index list; and perform data transfer using the first controller key index list. Prior to receiving the instruction, data transfer is performed using the second controller key index list. Data transfer continues during the updating. The controller is further configured to update the second controller key index list to match the first controller key index list. The first controller key index list and the second controller key index list each comprise key indices for a first tenant and a second tenant. During the updating, the first tenant can proceed with data transfer and the second tenant remains idle. The updating comprises either: changing the first value to a second value; or adding a third value to the first controller key index list or the second controller key index list.

In another embodiment, a data storage device comprises: memory means; and a controller coupled to the memory means, the controller including: a data path; and a control path, wherein the control path includes: a namespace/key indexing module; a processor; a mux coupled to the processor; a first indirect list module coupled between the mux and the namespace/key indexing module; and a second indirect list module coupled between the mux and the namespace/key indexing module. The controller further includes a keys memory module coupled between the processor and the data path. The controller is configured to switch between the first indirect list module and the second indirect list module. The controller is further configured to update key lists in the first indirect list module and the second indirect list module. The updating occurs to the first indirect list module at a time distinct from the updating of the second indirect list module.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
maintain a local key index list, wherein the local key index list includes a plurality of entries with each entry corresponding to a key, wherein a first entry of the plurality of entries is a spare entry and a second entry of the plurality of entries comprises a first value;
maintain a controller key index list, wherein the controller key index list includes a plurality of controller key entries corresponding to the local key index list and wherein a third entry of the plurality of controller key entries comprises the first value;
receive an instruction to change the first value to a second value;
enter the second value into the spare entry;
mark the second entry as a spare entry; and
change the third entry to the second value.

2. The data storage device of claim 1, wherein the controller key index list correlates to a namespace key index, wherein the namespace key index includes at least a first namespace and a second namespace.

3. The data storage device of claim 2, wherein the first value is for the first namespace.

4. The data storage device of claim 3, wherein the second namespace remains operational during the receiving, the entering, the marking, and the changing.

5. The data storage device of claim 1, wherein a fourth entry of the plurality of controller key entries comprises the first value.

6. The data storage device of claim 5, wherein the controller is further configured to change the fourth entry to the second value.

7. The data storage device of claim 1, wherein the controller is further configured to receive commands from a first host and a second host.

8. The data storage device of claim 7, wherein the controller is further configured to process commands from the second host while performing the entering, marking, and changing.

9. A data storage device, comprising:
a memory device; and
a controller coupled to the memory device, wherein the controller is configured to:
maintain a first controller key index list, wherein the first controller key index list includes a plurality of first controller key entries and wherein a first controller key index first entry comprises a first value;
maintain a second controller key index list, wherein the second controller key index list includes a plurality of controller key entries and wherein a second controller key index first entry comprises the first value;
receive an instruction to update the first controller key index list or the second controller key index list;
update the first controller key index list; and perform data transfer using the first controller key index list.

10. The data storage device of claim 9, wherein prior to receiving the instruction, data transfer is performed using the second controller key index list.

11. The data storage device of claim 10, wherein data transfer continues during the updating.

12. The data storage device of claim 9, wherein the controller is further configured to update the second controller key index list to match the first controller key index list.

13. The data storage device of claim 12, wherein the first controller key index list and the second controller key index list each comprise key indices for a first tenant and a second tenant.

14. The data storage device of claim 13, wherein during the updating, the first tenant can proceed with data transfer and the second tenant remains idle.

15. The data storage device of claim 9, wherein the updating comprises either:
- changing the first value to a second value; or
- adding a third value to the first controller key index list or the second controller key index list.

* * * * *